United States Patent [19]  [11] Patent Number: 4,469,216
Haataja et al.  [45] Date of Patent: Sep. 4, 1984

[54] MULTIPLE FUNNEL FLAKE ALIGNER FOR MAKING A LOOSELY FELTED MAT OF ALIGNED WOOD FLAKES

[75] Inventors: Bruce A. Haataja, Lake Linden; Tauno B. Kilpela, Atlantic Mine; Gordon P. Krueger, Hancock; Roy D. Adams, Houghton, all of Mich.

[73] Assignee: Board of Control of Michigan Technological University, Houghton, Mich.

[21] Appl. No.: 365,500

[22] Filed: Apr. 5, 8198

[51] Int. Cl.³ .............................................. B65G 47/24
[52] U.S. Cl. ..................................................... 198/382
[58] Field of Search ............... 198/569, 565, 382, 532, 198/363, 381; 264/108, 24; 425/831, 81.1

[56] References Cited

U.S. PATENT DOCUMENTS 2,642,979  6/1953  Beech ................................. 198/532
3,645,814  2/1972  Knoepfler et al. ................. 425/81.1
3,828,399  8/1974  Lambert ............................. 425/83.1

FOREIGN PATENT DOCUMENTS 369482  3/1932  United Kingdom ................ 198/565
816285  7/1959  United Kingdom ................ 198/382

Primary Examiner—Joseph E. Valenza
Assistant Examiner—Dennis J. Williamson

[57] ABSTRACT

Apparatus for forming a loosely felted mat of thin elongated wood flakes with said flakes being aligned in mutually parallel relation. The apparatus includes a mat supporting surface, a hopper for holding a quantity of wood flakes, and a funnel assembly for receiving wood flakes from the hopper and for causing the flakes to be aligned in substantially parallel side-by-side relation as they are deposited on the supporting surface. The funnel assembly includes a plurality of funnels positioned in adjacent side-by-side relation, the funnels each including inclined walls having lower edges defining an elongated narrow opening adjacent the supporting surface and upper edges defining an opening wider than said narrow opening and for receiving wood flakes from the hopper. The narrow openings of the funnels are parallel and distribute the flakes uniformly across the supporting surface.

1 Claim, 3 Drawing Figures

U.S. Patent   Sep. 4, 1984   4,469,216
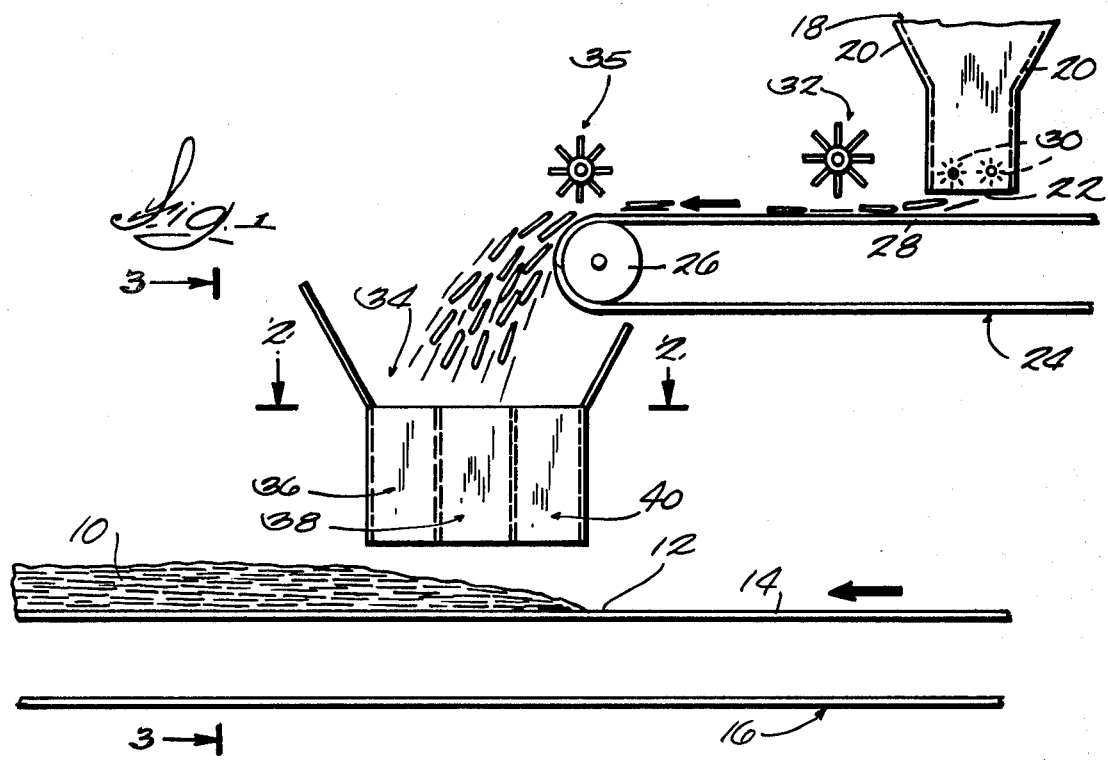
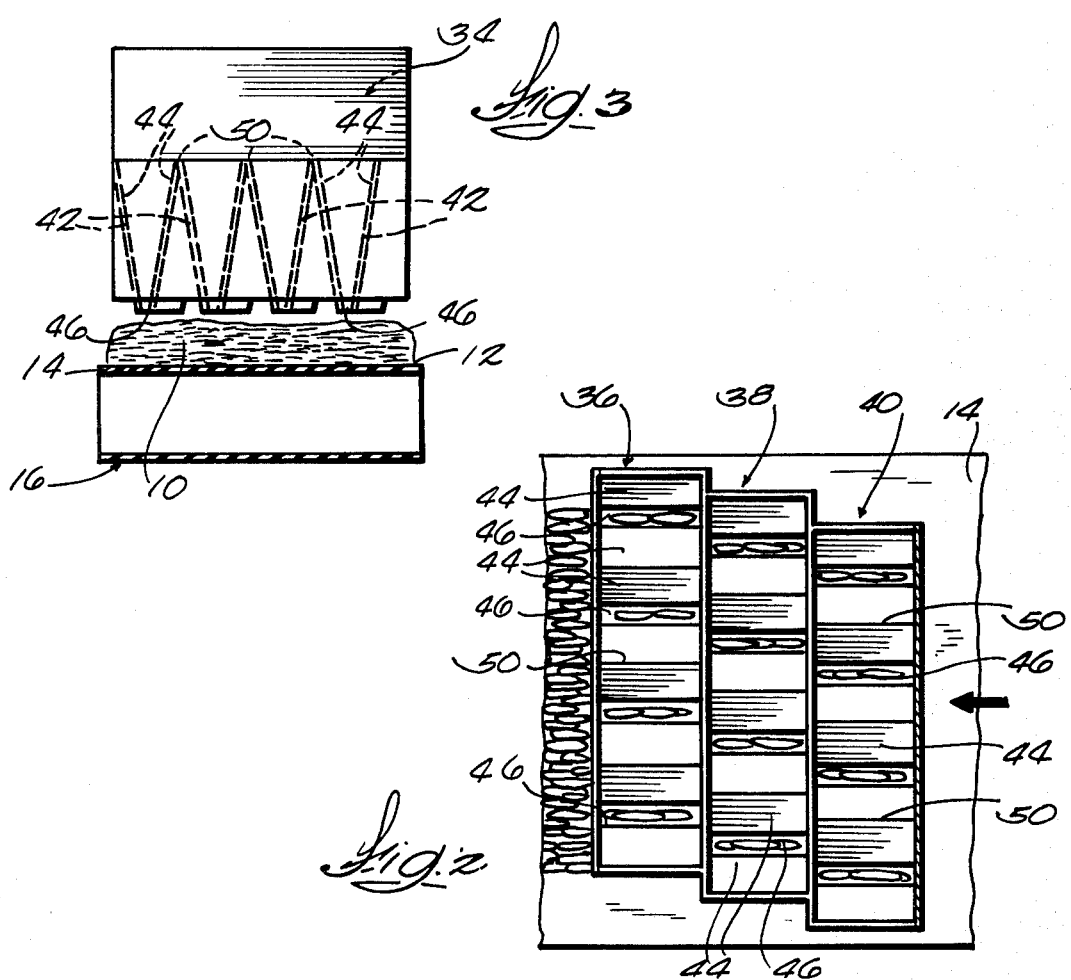

MULTIPLE FUNNEL FLAKE ALIGNER FOR MAKING A LOOSELY FELTED MAT OF ALIGNED WOOD FLAKES

FIELD OF THE INVENTION

The invention relates to compressed wood particle products and more particularly to apparatus for forming a loosely felted mat of elongated aligned wood flakes, the mat being adapted to be compressed to form a composite wood product.

BACKGROUND PRIOR ART

As set forth in the Lund et al. U.S. Pat. No. 4,241,133, issued Dec. 23, 1980 and assigned to the assignee of the present invention, it has been found to be desirable in the construction of compressed or composite wood particle products to employ wood flakes which are very thin and which have a length at least several times their width and to align the wood flakes in mutually parallel alignment and in alignment with the longitudinal axis of the product being produced. This produces a product having substantially improved strength characteristics in the direction of alignment of the wood flakes. The production of such compressed wood products formed from an assembly of wood particles first requires the formation of a loosely felted mat of wood particles. The mat is then compressed to form a densified panel or board. One problem encountered in forming the loosely felted mat is that the alignment or orientation of the elongated wood flakes is made difficult because the wood flakes, which are very light and comparatively fragile, have to be handled en masse, and this has resulted in the clogging of the known machines that were tried for this purpose.

Examples of prior art attempts to design suitable apparatus for forming mats of aligned wood strands are set forth in the U.S. Pat. No. 3,478,861, issued Nov. 18, 1969; the Elmendorf U.S. Pat. No. 3,220,743, issued Aug. 24, 1965; the Turner et al. U.S. Pat. No. 3,721,329, issued Mar. 30, 1973; the Urmanov U.S. Pat. No. 3,963,400, issued Jun. 15, 1976; and Canadian Pat. No. 597,941, issued May 10, 1960.

Attention is also directed to the Hostettler U.S. Pat. No. 3,226,764, issued Jun. 4, 1966; the Hostettler U.S. Pat. No. 3,070,838, issued Jan. 1, 1963; the Carlsson et al. U.S. Pat. No. 3,692,612, issued Sept. 19, 1972; the Paerels et al. U.S. Pat. No. 3,372,217, issued Mar. 5, 1968; the Axer et al. U.S. Pat. No. 3,824,058, issued Jul. 16, 1974; and the Chapman U.S. Pat. No. 2,992,152, issued Jul. 11, 1961.

SUMMARY OF THE INVENTION

The invention includes apparatus for forming an elongated continuous mat of elongated wood flakes mixed with a binder and adapted to be compressed to form a densified composite wood product. The apparatus of the invention includes means for depositing elongated wood flakes on a supporting surface and for aligning the wood flakes in mutually parallel relation. The means for continuously feeding and aligning includes a hopper for containing wood flakes and a plurality of funnels positioned in side-by-side relation and for receiving flakes from the hopper and for depositing the flakes on the supporting surface. The funnels each include downwardly sloping smooth side walls converging to form an elongated narrow opening at their lower ends, the elongated narrow openings of the plurality of funnels being parallel. Upon entering the top of the funnel, the flakes fall by force of gravity to the narrow opening at the bottom. As the flakes fall, they impinge against the inclined sidewalls of the funnels and are reoriented from a random to a mutually parallel aligned orientation.

More particularly, the invention includes apparatus for forming a loosely felted mat of thin elongated wood flakes with the flakes being aligned in mutually parallel relation. The apparatus includes a mat supporting surface, means for holding a quantity of wood flakes, and means for feeding wood flakes from the holding means onto the supporting surface and for causing the flakes to be aligned in substantially parallel side-by-side relation. The means for feeding and aligning includes a plurality of funnels positioned in adjacent side-by-side relation, the funnels each including inclined walls having lower edges defining an elongated narrow opening adjacent the supporting surface and upper edges defining an opening wider than the narrow opening and for receiving wood flakes from the means for holding. The funnels are positioned so that the narrow openings defined by the lower edges of the inclined walls are parallel.

In one embodiment, a plurality of the funnels are positioned together in adjacent side-by-side relation and define a first row of funnels extending transversely to the longitudinal direction of the elongated narrow openings of the funnels, and a plurality of the funnels are positioned together in adjacent side-by-side relation and define a second row of funnels parallel to the first row of funnels and adjacent thereto. The second row of funnels is offset laterally with respect to the first row of funnels such that the lower edges defining the elongated openings of the funnels of the second row define lines parallel to and spaced laterally from the lines defined by the lower edges defining the elongated openings of the funnels of the first row.

In one embodiment, the supporting surface comprises a conveyor belt having an upper belt flight adapted to be continuously moving, and the elongated openings are substantially parallel to the direction of movement of the belt so that elongated wood flakes deposited by the funnels are aligned substantially parallel to the direction of movement of the conveyor belt.

Various other features and advantages of the invention will be apparent from the following description of a preferred embodiment, from the claims, and from the drawings.

BRIEF DESCRIPTION OF THE DRAWINGS

FIG. 1 is a side elevation view of apparatus embodying the present invention and for forming a loosely felted mat of aligned wood flakes.

FIG. 2 is a cross section view taken along line 2—2 in FIG. 1.

FIG. 3 is a cross section view taken along line 3—3 in FIG. 1.

Before describing a preferred embodiment of the invention in detail, it is to be understood that the invention is not limited in its application to the details of construction nor to the arrangement of the components set forth in the following description or illustrated in the drawings. The invention is capable of other embodiments and of being practiced and carried out in various ways. Also, it is to be understood that the phraseology and terminology employed herein is for the purpose of description and should not be regarded as limiting.

DESCRIPTION OF A PREFERRED EMBODIMENT

Illustrated in FIG. 1 is an apparatus for forming an elongated continuous loosely felted mat 10 comprised of elongated wood flakes and a binder, this mat 10 being adapted to be placed in a press (not shown) and to be compressed therein to form a densified composite wood product such as is illustrated, for purposes of example, in the Lund et al. U.S. Pat. No. 4,241,133.

The apparatus illustrated in FIG. 1 includes a means for depositing a furnish comprised of a mixture of elongated wood flakes and a binder onto a supporting surface 12 to thereby form a loosely felted mat of flakes on the supporting surface. While the supporting surface 12 can have varied configurations, in the illustrated construction it is formed by the upper belt flight 14 of a conveyor belt 16.

While the furnish may be comprised of wood fibers, strands, particles or chips for use in making particleboard, fiberboard or flakeboard, in a preferred embodiment the furnish may also be comprised of a mixture of wood flakes and a binder material as set forth in the Lund et al. U.S. patent referred to above. In such an application it is preferred that the wood flakes be oriented in the loosely felted mat in mutually parallel relation and in parallel relation to the longitudinal axis of the product to be formed to thereby produce a compressed wood product having improved strength characteristics. Additionally, it is preferred that the wood flakes of the furnish should have an average length of about 0.5 inch to about 3.5 inches, and an average thickness of about 0.01 to about 0.05 inch. Flakes thinner than about 0.01 inch tend to require excessive amounts of binder to be mixed with these flakes if an adequate bonding of the flakes is to occur in the compressed product. Flakes thicker than about 0.05 inch are relatively stiff and tend to require excessive compression in order to obtain the desired intimate contact therebetween. In any given batch, some of the flakes can be shorter than 0.5 inch and some can be longer than 3.5 inches so long as the overall average length of the flakes is within the above range. The same is true for the thickness. To facilitate proper alignment of the flakes, it is preferred that the flakes should have a length which is several times the width. Using this constraint as a guide, the average width of the flakes should be about 0.1 to 0.5 inches.

The furnish is formed by introducing flakes of the size described above into a conventional blender wherein predetermined amounts of a binder are applied to the flakes as they are tumbled or agitated in the blender. Suitable binders include those used in the manufacture of particleboard and similar pressed particle products. Such binders may include organic polyisocyanates including those curable at room temperature or urea formaldehyde.

Referring again to the means for depositing the furnish onto the supporting surface, while various depositing means could be employed, in the illustrated arrangement that apparatus includes a hopper 18 adapted to contain a quantity of wood flakes in spaced relation above the supporting surface 12. The hopper 18 can be open at the top for receiving wood flakes, and includes side walls 20 which slope downwardly and converge. The hopper 18 includes an elongated opening 22 at its bottom, the opening 22 being positioned immediately above the upper surface of a conveyor 24. In the illustrated construction, the conveyor 24 comprises a conveyor belt supported at its opposite ends by rollers 26 (one shown) and includes an upper belt flight 28 positioned beneath the opening 22 of the hopper. The hopper 18 also includes a pair of rotatably driven picker rolls 30 positioned therein and adjacent the opening 22, the picker rolls 30 being adapted to control the quantity of furnish deposited on the belt flight 28 and to provide for distribution of the furnish across the surface of the belt.

Means are also provided for causing a further uniform distribution of the elongated wood flakes across the surface of the upper belt flight 28 as the flakes are carried away from the hopper 18 by the belt 24. While various means could be provided, in the illustrated arrangement a picker wheel 32 is positioned in closely adjacent relation to the surface of the upper flight 28 of the conveyor belt. Means (not shown) are also provided for causing rotation of the picker wheel 32 in the counterclockwise direction as seen in FIG. 1.

The conveyor 24 is driven such that the upper belt flight moves from right to left as seen in FIG. 1 and to deposit the wood flakes into the upper portion of a means for aligning the flakes comprising a multiple funnel assembly 34 having a configuration to be described in greater detail hereinafter.

Means are also provided adjacent the end of the conveyor 24 for controlling the quantity of wood flakes deposited in the multiple funnel assembly 34. In the illustrated construction this means comprises a picker wheel or distributor wheel 35 positioned adjacent the end of the conveyor 24 and adjacent its upper surface.

The multiple funnel assembly 34 includes a plurality of rows 36, 38 and 40 of funnels 42, the rows 36, 38 and 40 being positioned in adjacent side-by-side relation, each row extending across the width of the supporting surface 12 perpendicularly to the direction of movement of the upper belt flight 14, and each of the rows being comprised of a plurality of funnels 42 positioned in adjacent side-by-side relation. Each funnel 42 is comprised of a pair of inclined planar walls 44 converging at their lower ends to form an elongated narrow opening 46. While the multiple funnel assembly 34 can be formed from various materials such as metal, plastic or ceramics, it is important that the inner surfaces of the funnels 42 are smooth and have a low coefficient of friction in order not to inhibit the free fall of the flakes through the funnels.

The openings 46 in the lower ends of each of the funnels 42 should be of sufficient size that all of the flakes, within the size range referred to above, will pass through the openings, and the openings 46 should be sufficiently narrow that the flakes falling through that funnels 42 will be oriented in substantially parallel orientation and are not permitted misalignment. For purposes of example, when the funnels are employed to handle wood flakes of the size referred to above, it is convenient to form the funnels with an elongated opening approximately 1 inch in width with a length of approximately 6 inches.

In the illustrated arrangement, the funnels 42 are each aligned with the elongated openings 46 extending in the direction of movement of the conveyor belt such that the flakes deposited by the funnels are mutually parallel and parallel to the direction of movement of the upper belt flight 14. The funnels 42 forming each row 36, 38 and 40 are also positioned in closely adjacent relation to each other with the upper edges of the inclined walls of one funnel intersecting the upper edges of the inclined walls of adjacent funnels and so as to form a very narrow or sharp upper edge 50. At the lower ends of the funnels 42, the openings 46 of the funnels of each transverse row are spaced apart in a direction perpendicular to the direction of movement of the supporting surface 12. To provide for an even distribution of flakes across the width of the upper belt flights, rows 36, 38 and 40 are staggered or offset with respect to each other in the direction perpendicular to the direction of movement of the conveyor belt so that the flakes dispursed by the the funnels in row 38 are deposited between the lines of wood flakes deposited by the funnels of row 36 as the supporting surface 12 moves continuously beneath the funnels 42 of row 36, and the wood flakes deposited by the funnels in row 40 are deposited between the rows of wood flakes deposited by the funnels of rows 36 and 38.

While the illustrated apparatus is described as forming a single layer of wood flakes, in other constructions several flake feeding assemblies as described above could be positioned in series along the length of the conveyor 16 for depositing several layers of wood flakes in series one on top of the other.

In other embodiments of the invention, means can also be provided for supporting the funnel assembly 34 for vertical movement to permit adjustment of the height or depth of the mat to be formed.

Various features of the invention are set forth in the following claims.

We claim:

1. An apparatus for forming a loosely felted mat of thin elongated wood flakes with said flakes being aligned in mutually parallel relation, said apparatus comprising means defining a mat supporting surface including a conveyor belt having an upper belt flight adapted to be continuously moving, means for holding a quantity of wood flakes, means for continuously feeding wood flakes from said means for holding onto said supporting surface and for aligning said flakes in substantially parallel side-by-side relation, said means for feeding and aligning including means defining a plurality of rows of funnels, said funnels each including inclined walls having lower edges defining an elongated narrow opening adjacent said supporting surface and upper edges defining an opening wider than said elongated narrow opening and for receiving wood flakes from said means for holding, said wider opening being directly above said elongated narrow opening, said rows of funnels each extending in a direction transverse to the direction of movement of said conveyor belt and each including a plurality of funnels positioned in adjacent side-by-side relation, said funnels being positioned such that said upper edges of adjacent funnels are joined and comprise narrow linear edges, such that said lower edges of adjacent funnels are spaced apart, and such that said elongated narrow openings defined by said lower edges are substantially parallel to the direction of movement of said conveyor belt so that elongated wood flakes deposited by said funnels are aligned substantially parallel to the direction of movement of said conveyor belt, said rows of funnels being positioned in adjacent side-by-side relation in the direction of movement of said conveyor belt, with said rows being staggered such that the longitudinal axes defined by said elongated openings of said funnels of any one of said rows are positioned laterally, with respect to the direction of movement of said conveyor belt, of the longitudinal axes defined by said elongated openings of said funnels of the others of said rows, so that the wood flakes are deposited on said belt continuously and uniformly across said belt.

* * * * *